From United States Patent [19]
Gavin

[11] 4,086,913
[45] May 2, 1978

[54] SOLAR HEAT COLLECTOR CONSTRUCTION
[75] Inventor: Joseph G. Gavin, Huntington, N.Y.
[73] Assignee: Grumman Aerospace Corporation, Bethpage, N.Y.
[21] Appl. No.: 750,580
[22] Filed: Dec. 15, 1976
[51] Int. Cl.² .............................................. F24J 3/02
[52] U.S. Cl. ............................... 126/271; 165/171; 165/173; 29/157.3 C
[58] Field of Search ............ 126/270, 271; 237/1 A; 165/171, 173, 49, 76; 29/157.3 C

[56] References Cited
U.S. PATENT DOCUMENTS

| | | | |
|---|---|---|---|
| 1,125,113 | 1/1915 | Junkers | 165/171 |
| 2,736,406 | 2/1956 | Johnson | 165/171 |
| 3,259,184 | 7/1966 | Trulaske | 165/171 |
| 3,833,055 | 9/1974 | Munz et al. | 165/173 |
| 3,972,317 | 8/1976 | Gallagher | 165/171 |
| 4,011,856 | 3/1977 | Gallagher | 126/271 |

Primary Examiner—John J. Camby
Assistant Examiner—Henry C. Yuen
Attorney, Agent, or Firm—Richard G. Geib; Mellor A. Gill

[57] ABSTRACT

A solar heat collector having an array of liquid transporting tubes and a plurality of heat absorber panels joined by a tube gripping accommodation on each panel providing structural integrity and good thermal conductivity.

2 Claims, 8 Drawing Figures

SOLAR HEAT COLLECTOR CONSTRUCTION

FIELD OF INVENTION

The present invention relates to solar heat collectors and specifically to a novel and improved means for constructing solar heat collector absorber panels.

DESCRIPTION OF PRIOR ART

Many solar heat collectors employ tubes of copper or other metals to convey heat transport liquid (See Assignee's co-pending patent application Ser. No. 648,258 filed Jan. 12, 1976 now Pat. No. 4,015,586) which is heated by contact with the tube walls. The tubes in turn receive their heat from a flat plate, generally blackened, which is heated by the sun's rays. The connections between the plate and the tubes have been in many cases the cause of losses in performance, due to high thermal resistance associated with simple mechanical attachment. This problem has caused many designers to resort to soldering, brazing or welding the plates to the tubes in order to achieve a more perfect thermal union. But these forms of attachment are costly, especially when the plate and the tubes are of dissimilar metals, such as aluminum plates and copper tubes. Yet, aluminum is desirable as a plate material because of its low cost and high thermal conductivity, while copper is desirable as a tube material owing to its relative freedom from corrosion when used with untreated water.

The present invention overcomes the objections previously raised against mechanical attachment of aluminum plates to copper tubes, and realizes all of the advantages of that union. It is a type of metal plate (hereinafter referred to as a finplank) such as can be produced by the extrusion process, so shaped that it will fit between any two tubes in an array of evenly-spaced parallel tubes and will lock with the adjacent finplanks to tightly grip the tubes and hence provide a good thermal connection.

It is, therefore, a primary object of the invention to provide finplanks which can be attached mechanically to an array of tubes by a locking means which grips the tubes tightly and thereby secures a good thermal connection.

Another object is to provide finplanks which can be attached quickly and easily to an array of tubes so as to provide a good thermal connection and which may be of a different metal than the tubes and which may use grease or other substance to further enhance the thermal connection.

BRIEF DESCRIPTION OF THE DRAWINGS

Other objects and advantages of the invention will become more apparent during the course of the following description when taken in connection with the accompanying drawings.

In the drawings, wherein like numerals are employed to designate like parts.

DESCRIPTION OF THE PREFERRED EMBODIMENT

Figure 1:
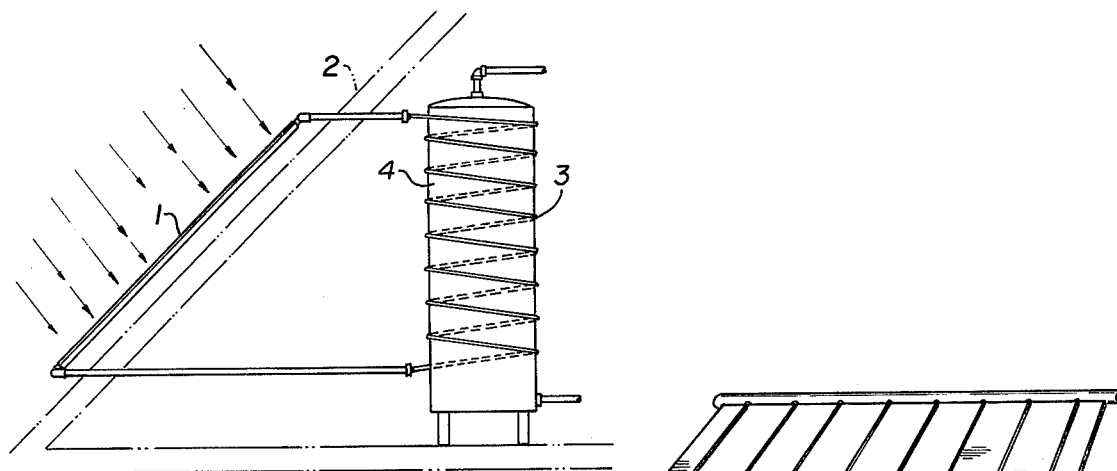
FIG. 1 is a schematic illustration of a use to which this invention may be put.

Referring to the drawings there is illustrated by FIG. 1 a solar collector assembly 1 according to this invention on roof 2 of a house for heating fluid in pipe heat exchanger 3 for a hot water tank 4.

Figure 2:
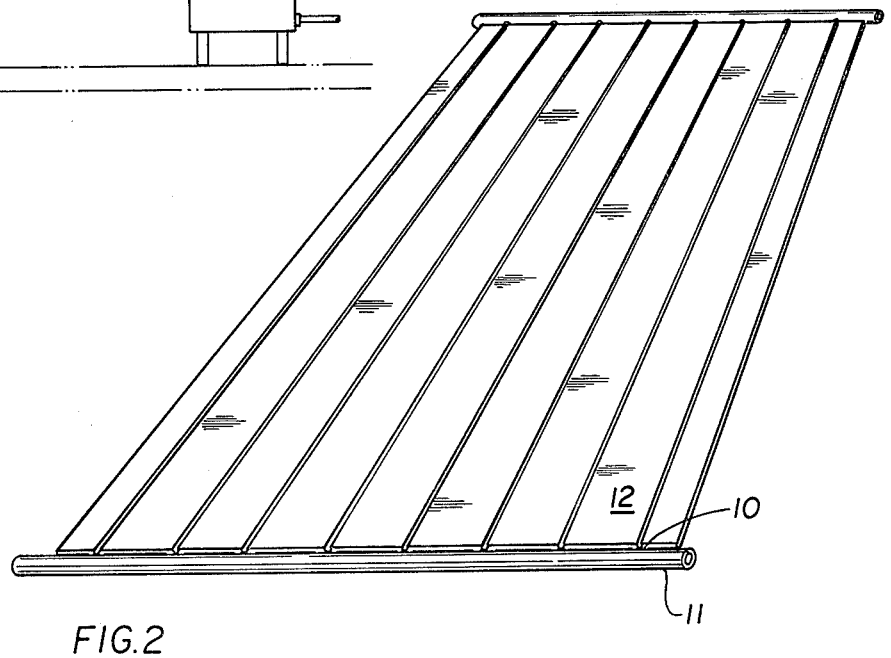
FIG. 2 is a three-quarter view of a solar heat collector absorber panel embodying the invention.
Figure 3:
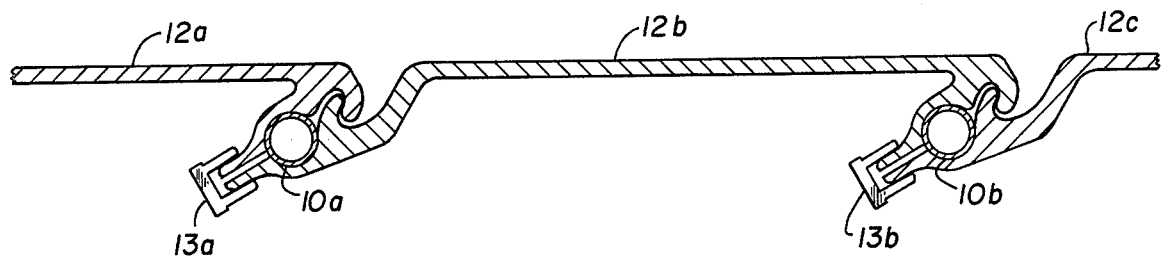
FIG. 3 is a cross-sectional view of a portion of the panel of FIG. 1.

The instant invention is more particularly illustrated in FIG. 2 where the solar heat collector absorber panel embodying the invention is there shown to include an array of evenly-spaced parallel tubes 10, joined to bottom header 11 to which are attached finplanks 12. In FIG. 3, a cross-sectional view of a portion of the solar collector panel is shown, consisting of finplanks 12a, 12b, and 12c enclosing tubes 10a, and 10b and secured by clips 13a and 13b. The view illustrates how the finplanks 12 lock together and how the clips 13 further secure the finplanks together. The clips 13 are made from an extrusion or other metal fabrication, in the shape shown, the inner faces being provided with a taper angle so that the gripping pressure of the clip increases as it is driven home. The finplanks 12 have a matching taper angle on the protruding lips. In addition, the faying surfaces may be roughened or provided with steps so as to enhance the gripping power of the clips 13 on the finplanks 12. The clips are made in short pieces for convenience in handling.

Figure 4:
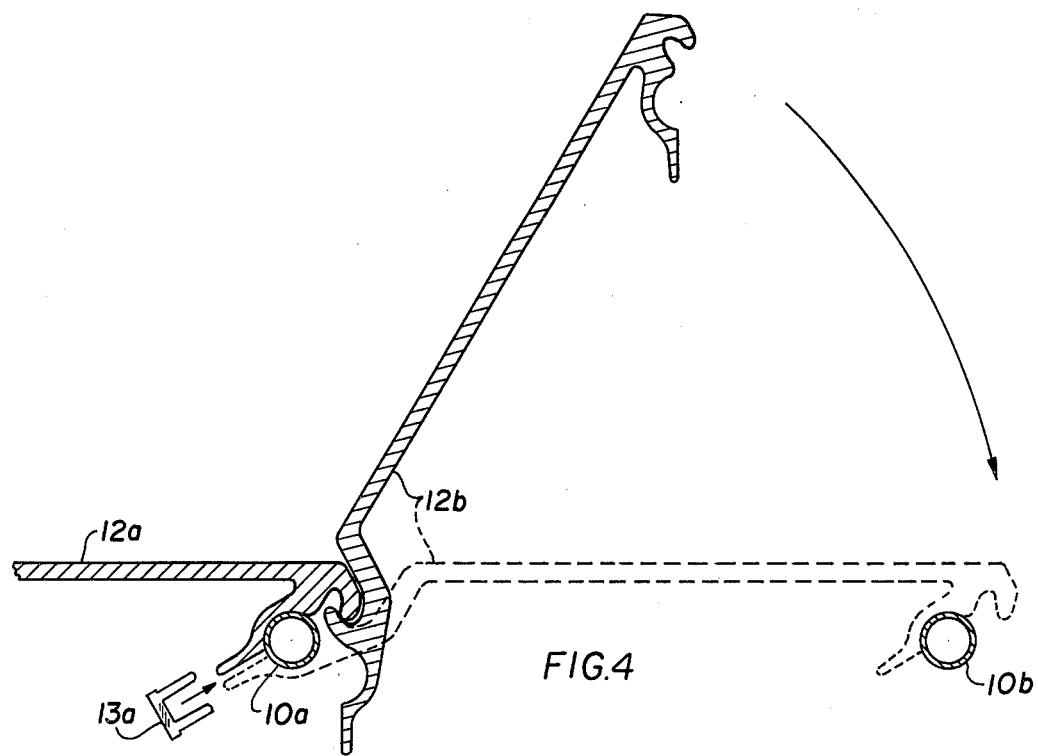
FIG. 4 is a view similar to FIG. 2 with the addition of an illustration showing method of attaching and locking a finplank to an adjacent one.

In assembling the solar collector panel, the parallel tubes are preassembled to headers. FIG. 4 illustrates how a finplank, 12b, is rotated into place around 12a (12c being not yet in position) enclosing tube 10a and being secured by clip 13a. In this view is shown how locking tongues on adjacent finplanks engage and form a fulcrum about which one finplank rotates to lock with the other and around the tube. Then the clips 13 are fitted over the protruding lips of the finplanks and driven home with a hammer blow. The drawings illustrate a sequential assembly of finplanks on the tube array, starting with finplank 12a, then 12b, 12c, etc. The first and last finplanks are half-planks, produced by shearing one plank lengthwise, each half-plank being attached at only one edge, as can be seen in FIG. 2.

Figure 5:
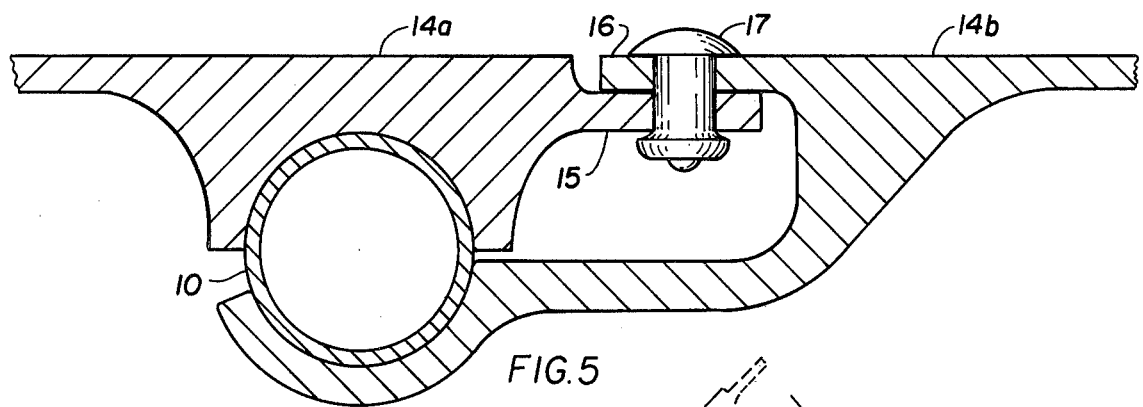
FIG. 5 is a cross-sectional view of a variation on the invention.
Figure 6:
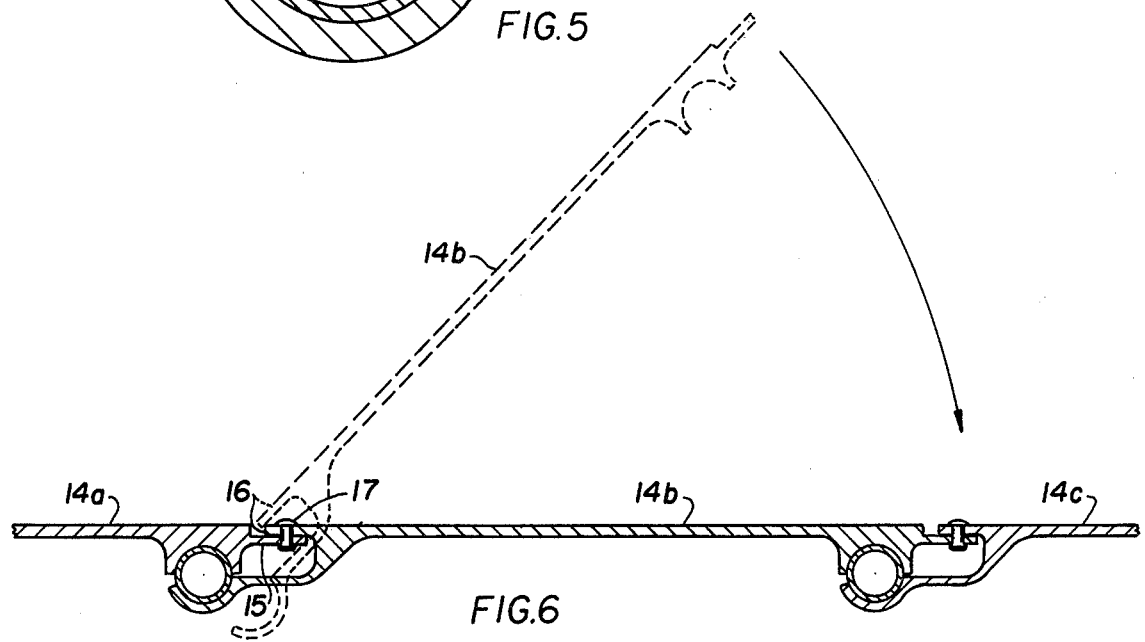
FIG. 6 is a view similar to FIG. 4 with the addition of an illustration showing method of attaching and locking that type of finplank to an adjacent one.

FIGS. 5 and 6 illustrate another embodiment of the present invention. FIG. 5 shows, in enlarged cross-section, the edges of two finplanks 14a and 14b enclosing a tube 10, interlocking by means of flange 15 and 16 and secured by a rivet 17.

FIG. 6 shows how finplank 14b is rotated into position around 14a (14c being not yet in place) after which blind rivet 17a is driven in pre-punched holes in the flange 15 and 16. This is illustrative of a sequential assembly of finplanks on the tube array, starting with finplank 14a, then 14b, then 14c, etc.

Figure 7:
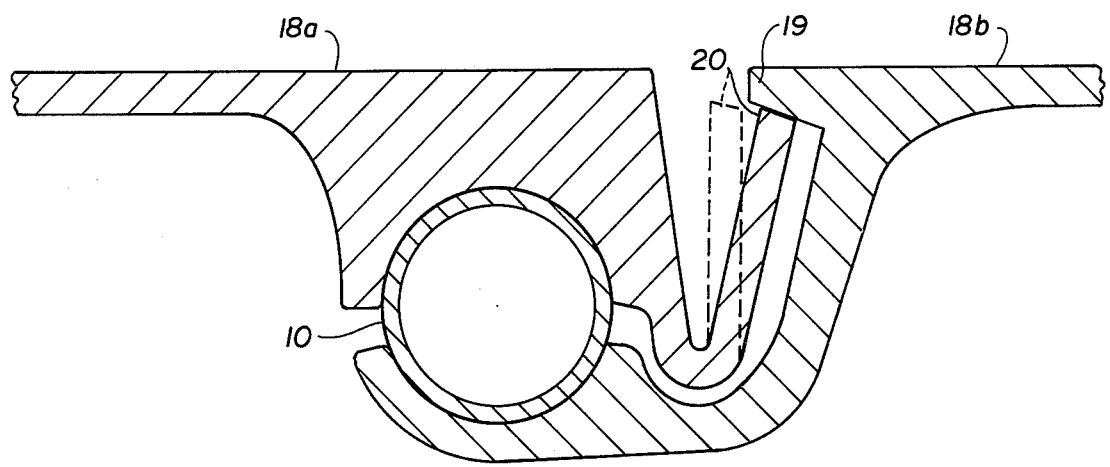
FIG. 7 is a cross-sectional view of still another variation of the invention.
Figure 8:
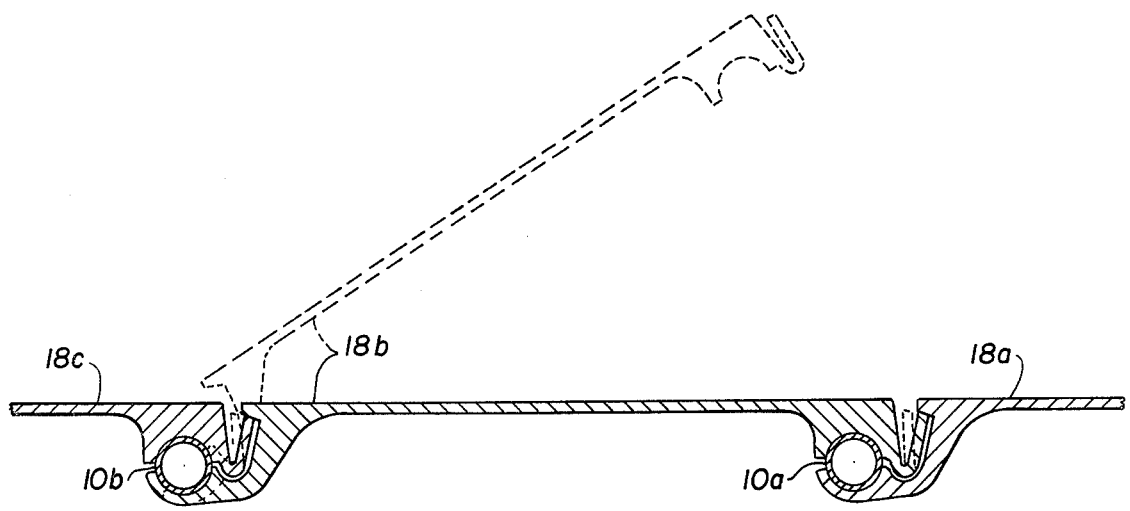
FIG. 8 is a view similar to FIGS. 4 and 6 for the variation of FIG. 7.

FIGS. 7 and 8 illustrate yet another embodiment of the present invention. FIG. 7 shows, in enlarged cross-section, the edges of two finplanks 18a and 18b, enclosing a tube 10 and interlocking by means of flanges 19 and deformed lips 20. FIG. 8 shows how a finplank 18b is rotated into position, rotating around tube 10b and enclosing 10a after which lip 20 is deformed by a swaging tool, or the like, to assume a locking position under 19 of finplank 18a. This is illustrative of a sequential assembly of finplanks on the tube array, starting with finplank 18a, then 18b, then 18c, etc.

Having described several operative embodiments of this invention it is now desired to set forth the protection sought by these Letters Patent in the appended claims.

1. A solar collector comprising:
   fluid conduit means including a plurality of tubes; and
   means to absorb solar energy and transfer same to said tubes, said means to absorb solar energy consisting of adjacent finplanks each having locking tongues cooperating to encircle the tubes at edges of the adjacent finplanks, said finplanks also having lips extending away from the tubes, and clip means encircling said lips and closing said edges of the adjacent finplanks about said tubes.

2. The structure of claim 1 and further characterized as a plurality of finplanks whose opposite edges are configured to interlock with other finplanks by use of said plurality of tubes to form a contiguous surface acting as a solar heat collector for heating fluid circulating in said tubes from and to headers at each end of the structure.

* * * * *